US009581166B2

(12) United States Patent
Hoerr

(10) Patent No.: US 9,581,166 B2
(45) Date of Patent: Feb. 28, 2017

(54) METHOD AND DEVICE FOR PNEUMATICALLY DRIVING A TURBOCHARGER ROTOR IN A BALANCING MACHINE

(71) Applicant: Schenck RoTec GmbH, Darmstadt (DE)

(72) Inventor: Friedrich Hoerr, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 337 days.

(21) Appl. No.: 14/380,227

(22) PCT Filed: Mar. 13, 2013

(86) PCT No.: PCT/EP2013/055109
§ 371 (c)(1),
(2) Date: Aug. 21, 2014

(87) PCT Pub. No.: WO2013/135758
PCT Pub. Date: Sep. 19, 2013

(65) Prior Publication Data
US 2015/0037150 A1    Feb. 5, 2015

(30) Foreign Application Priority Data

Mar. 14, 2012   (DE) .................. 10 2012 102 160

(51) Int. Cl.
*F04D 15/00* (2006.01)
*F04D 27/00* (2006.01)
(Continued)

(52) U.S. Cl.
CPC ....... *F04D 15/0088* (2013.01); *F04D 27/001* (2013.01); *F04D 29/662* (2013.01);
(Continued)

(58) Field of Classification Search
CPC .... F04D 15/0088; F04D 9/662; F04D 27/001; G05D 11/36; G05B 13/62; G05B 2219/41303; G01M 1/02
See application file for complete search history.

(56) References Cited

U.S. PATENT DOCUMENTS

| 2,243,458 A | | 5/1941 | Esval et al. | |
| 2,748,603 A | * | 6/1956 | Wilcox | ................... G01M 1/30 |
| | | | | 324/76.83 |

(Continued)

FOREIGN PATENT DOCUMENTS

| DE | 24 10 342 A1 | 3/1975 |
| DE | 10 2010 036954 A1 | 2/2012 |

(Continued)

OTHER PUBLICATIONS

International Search Report of PCT/EP2013/055109, mailed Jun. 27, 2013.
(Continued)

*Primary Examiner* — Atif Chaudry
(74) *Attorney, Agent, or Firm* — Collard & Roe, P.C.

(57) ABSTRACT

Disclosed is a method in which the propulsive power of a drive nozzle (2) is controlled by means of a programmable logic control device (24) having an adjustable internal controller (25) in dependence upon the rotational frequency of a turbocharger rotor (1) detected by a speed sensor (26). Parameters necessary for control are determined empirically in a tuning run which includes tuning the controller (25) to a proportional control action with high gain Kp and inputting the nominal balancing speed as target value for the controller (25), monitoring and comparing the actual speed with the target value. If the actual speed exceeds the set target value, halving the gain Kp of the controller (25) and repeating the run until the actual speed is below the set target value. Then it includes approximating the actual speed to the
(Continued)

Figure 1:
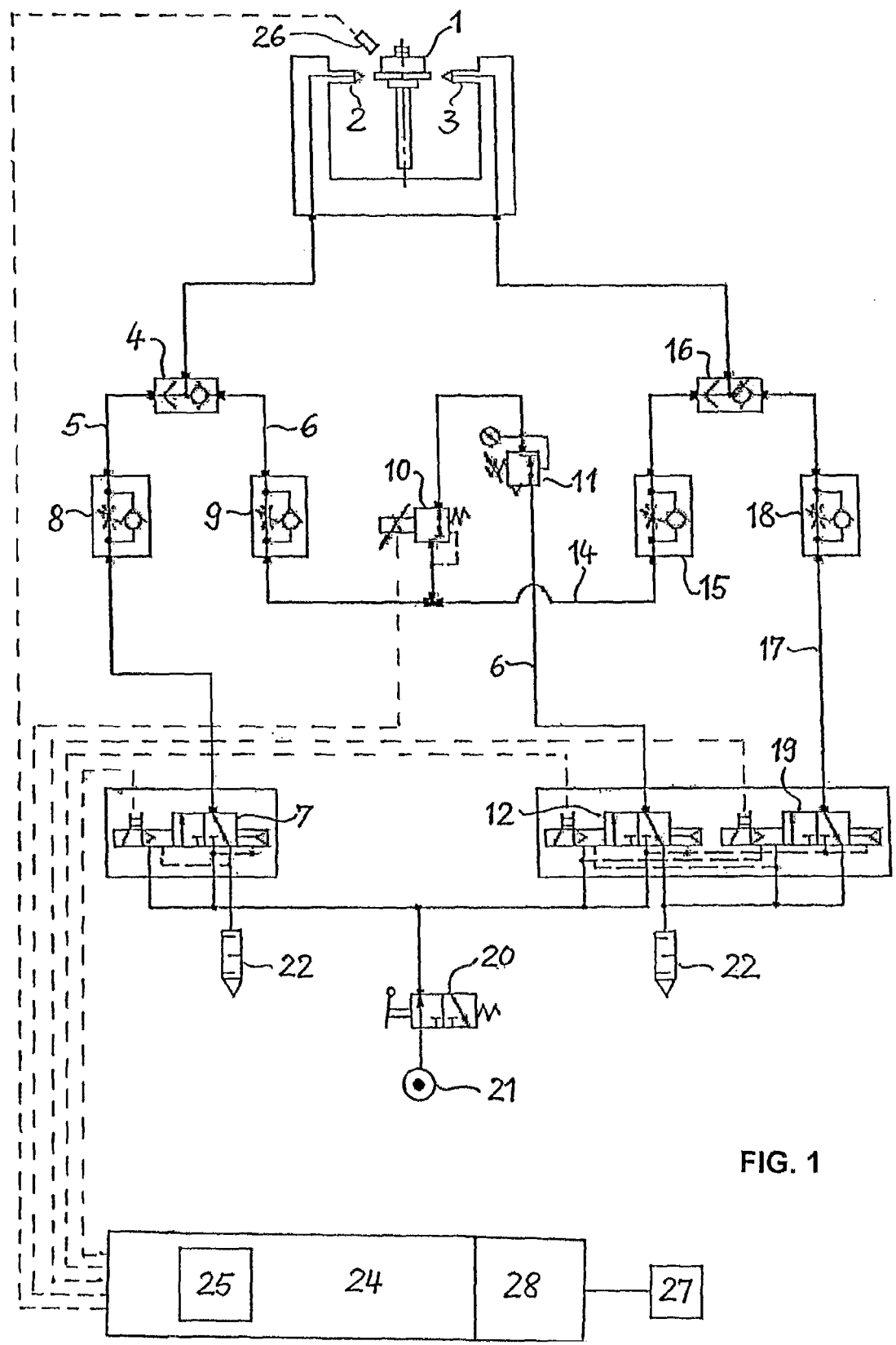

target speed by generating an additional target value, additively applying the additional target value to the target value, and incrementing or decrementing the additional target value until the target speed of the turbocharger rotor (1) is reached.

15 Claims, 2 Drawing Sheets

(51) Int. Cl.
    *F04D 29/66*    (2006.01)
    *G05D 13/62*    (2006.01)
    *G05B 11/36*    (2006.01)
    *G01M 1/02*    (2006.01)

(52) U.S. Cl.
    CPC ............ *G05B 11/36* (2013.01); *G05D 13/62* (2013.01); *G01M 1/02* (2013.01); *G05B 2219/41303* (2013.01); *G05B 2219/41304* (2013.01)

(56) References Cited

U.S. PATENT DOCUMENTS

| | | | | | |
|---|---|---|---|---|---|
| 4,467,649 A | * | 8/1984 | Mueller | ............... | G01M 1/06 73/462 |
| 4,543,825 A | * | 10/1985 | Schonfeld | ............... | G01M 1/04 73/459 |
| 4,976,147 A | * | 12/1990 | Okochi | ............... | G01M 1/04 73/455 |
| 5,067,349 A | * | 11/1991 | Hirchert | ............... | G01M 1/06 73/471 |
| 5,353,640 A | * | 10/1994 | Jiang | ............... | G01M 1/06 73/460 |
| 6,198,246 B1 | | 3/2001 | Yutkowitz | | |
| 2013/0276552 A1 | * | 10/2013 | Sanchez | ............... | G01N 1/2252 73/863.03 |
| 2015/0037150 A1 | * | 2/2015 | Hoerr | ............... | G05D 13/62 416/1 |

FOREIGN PATENT DOCUMENTS

EP        0 699 900 B1    3/1996
JP        2008-082296 A    4/2008

OTHER PUBLICATIONS

Schleicher et al, Regelungstechnik—Ein Leitfaden fïr Einsteiger, Verbesserte Auflage 2003. Fulda: JUMO GmbH & Co. KG, 2003, with an Excerpt in English (Translation of relevant pages cited in a German Office Action), pp. 45-51, 69, 76-77.

\* cited by examiner

METHOD AND DEVICE FOR PNEUMATICALLY DRIVING A TURBOCHARGER ROTOR IN A BALANCING MACHINE

CROSS REFERENCE TO RELATED APPLICATIONS

This application is the National Stage of PCT/EP2013/055109filed on Mar. 13, 2013, which claims priority under 35 U.S.C. §119 of German Application No. 10 2012 102 160.0 filed on Mar. 14, 2012, the disclosure of which is incorporated by reference. The international application under PCT article 21(2) was not published in English.

This invention relates to a method for pneumatically driving a turbocharger rotor in a balancing machine in which the propulsive power of a pneumatic drive is adjustable by means of a pressure control valve connected upstream of the pneumatic drive and the rotational frequency of the turbocharger rotor is detected by a speed sensor and transmitted to a control device as a speed signal.

Exhaust-gas-driven turbochargers include a turbocharger rotor which in operation reaches very high operating speeds frequently exceeding 100,000 $\text{min}^{-1}$ and therefore needs to be balanced to precise accuracy to avoid excessively high bearing loads and noises. The turbocharger rotor is commonly comprised of a shaft carried in a bearing housing and mounting at one end a turbine wheel and at the other end a compressor wheel. For unbalance measurement, it is desirable to drive turbocharger rotors at an angular velocity corresponding essentially to the normal operating speed. Compressed air directed to the turbine wheel is conventionally used for the drive.

EP 0 699 900 B1 discloses a machine for balancing turbochargers in which the center housing of a turbocharger core assembly dismantled of turbine housing and compressor housing is mounted on a vibratory measuring plate and connected to a lubricating-oil line. To drive the turbocharger rotor, the turbine wheel is driven by a jet of compressed air discharged from a nozzle connected to a compressed-air line. Arranged upstream of the nozzle is a pressure regulator and a solenoid valve for shutting off the supply of compressed air. The pressure regulator is able to adjust the air pressure on the nozzle such that the turbocharger rotor is driven at a rotational frequency suitable for unbalance measurement. The rotational frequency measured by a photoelectric cell is transmitted to an electronic control processor which also receives the vibration signals of the vibrations of the measuring plate as detected by a vibration sensor in order to compute from this data the amount of unbalance to be corrected.

In the known device, adjustment of the drive speed desired for a balancing operation has to be performed each time by an operator adjusting the pressure regulator. In the event of speed variations occurring as a result of pressure fluctuations in the compressed-air supply or influences attributable to batch differences, these have to be likewise corrected by the operator. In addition, it is necessary to adapt the adjustment to various types of turbocharger rotor which can be balanced on the same machine.

In a test bench for turbochargers known from JP 2008 082296 A, the supply of air and fuel to a combustion chamber generating combustion gas for driving the turbine of the turbocharger is controlled automatically by a programmable logic control device with feedback using control valves in dependence upon the rotational frequency of the turbocharger measured by a sensor and the temperature of the combustion gas measured by a sensor.

It is an object of the present invention to provide a method for controlling a balancing speed of a pneumatically driven turbocharger rotor which is suited to maintain the set balancing speed within narrow limits for the duration of measurement, and which enables automatic tuning of a controller for controlling the balancing speed of the driven turbocharger rotor within a short period and without repeated operator intervention.

According to the present invention, this object is accomplished by a method incorporating the features recited in claim 1. Advantageous further developments of the method and an advantageous device for implementing the method are recited in the subsequent claims.

In the method of the invention, for pneumatically driving a turbocharger rotor in a balancing machine, the propulsive power of a pneumatic drive is controlled in dependence upon the rotational frequency of the turbocharger rotor by means of a programmable logic control device having an adjustable internal controller, wherein the rotational frequency of the turbocharger rotor is detected by a speed sensor and transmitted to the controller as speed signal actual value, and wherein parameters necessary for the control are determined empirically by a tuning run comprising the following steps:

(a) tuning the controller to an exclusively proportional control action with high gain Kp and input of the nominal balancing speed as target value for the controller;

(b) starting the pneumatic drive and accelerating the turbocharger rotor and monitoring the actual speed of the turbocharger rotor and comparing the actual speed with the target value, continuing with step c if the actual speed exceeds the set target value, or continuing with step d if the actual speed is below the set target value;

(c) terminating the drive and decelerating the turbocharger rotor, halving the gain Kp of the controller and repeating step b;

(d) approximating the actual speed to the target speed by generating an additional target value and additively applying the additional target value to the set target value or by incrementing or decrementing the additional target value already added until the target speed of the turbocharger rotor is reached; and (e) storing the determined gain Kp of the controller, the set target value and the determined additional target value as parameters ready to be accessed for controlling future measuring runs of the turbocharger rotor subjected to the tuning run and further turbocharger rotors of corresponding type.

Using a fully automatic tuning run executed within a very short time period, the method of the invention enables the predetermined target speed of the turbocharger rotor to be adjusted and tuned-in for performing the unbalance measurement. The method is easy to implement, requiring merely the input of the balancing speed predetermined and to be used for the particular type of turbocharger rotor to be balanced. Accordingly, the automatic tuning run enables the desired reference reaction of the controller to be achieved at only minimal speed deviations. The method has proven to be highly process-reliable, and the constructional effort required to implement the method incurs no high costs.

According to another proposal of the invention, in an unbalance measuring run succeeding the tuning run and upon attainment of a narrow actual speed tolerance band, provision may be made for temporarily applying an I component to the controller which is used for loop tuning briefly and then frozen until the beginning of the next unbalance measuring run. Following freezing, the controller continues to operate as a pure P controller. The I component is then no longer effective, but its influence on the manipulated variable prior to freezing is maintained. In this way, steady-state errors can be compensated for, which may occur on turbocharger rotors of like type, for example, due to permissible manufacturing tolerances from one batch to the next.

In an advantageous further development of the method of the invention, the turbocharger rotor may be decelerated pneumatically under time control by the programmable logic control device, with the tuning run comprising a step f which includes decelerating the turbocharger rotor driven at target speed, computing the optimum braking time for deceleration until standstill, and storing it as readily accessible parameter for the control of future measuring runs of the turbocharger rotor and of turbocharger rotors of corresponding type in order to be able to correspondingly adjust the supply of brake air. The method enables the turbocharger rotor to be braked simply by means of a time-controlled two-position brake valve and a throttle check valve arranged down-stream thereof. Preferably, step f follows immediately upon step e so that the time required for determining the optimum braking time is minimal.

According to another advantageous embodiment of the invention, the braking power of the brake nozzle is controllable by the control device by means of a proportional pressure control valve according to a brake manipulated variable which is predetermined or determined empirically for a particular type of turbocharger rotor. In this embodiment, the tuning run may comprise a step f in which the turbocharger rotor driven at target speed is decelerated until standstill using a braking power predetermined by a programmed internal brake manipulated variable, the required braking time is measured, compared with a nominal braking time, and a type-specific brake manipulated variable is calculated. Step f may be followed by a step g in which the turbocharger rotor driven at target speed is decelerated until standstill using a braking power predetermined by the computed type-specific brake manipulated variable, the required braking time is measured, compared with the nominal braking time, in the event of a deviation, the type-specific brake manipulated variable is corrected by recalculation and stored as a readily accessible parameter for the control of future measuring runs of the turbocharger rotor subjected to the tuning run and further turbocharger rotors of corresponding type.

In order to accelerate the turbocharger rotor to target speed in the shortest possible time, the invention may provide for the pneumatic drive to be equipped with a time-controlled fast run-up function. To determine the optimum fast run-up time, it is possible according to the invention to accelerate the turbocharger rotor in the tuning run from standstill by activating the fast run-up function during a brief time span with the controller deactivated, with the optimum fast run-up time being calculated from the speed reached in that time span and stored as a readily accessible parameter for the control of future measuring runs of the turbocharger rotor and of similar types of turbocharger rotor.

The method of the invention is preferably programmed as control algorithm held ready for access in a data memory allocated to the programmable logic control device, so that the method can be implemented automatically by the programmable logic control device upon its activation.

According to the invention, an advantageous device for pneumatically driving a turbocharger rotor in a balancing machine comprises a pneumatic drive having at least one drive nozzle connectible to a compressed-air line for generating a drive air stream directed to a turbine wheel of the turbocharger rotor, wherein the flow rate of the drive air stream is controllable in dependence upon the speed of the turbocharger rotor by means of a proportional pressure control valve arranged upstream of the at least one drive nozzle and controlled by a programmable logic control device, and wherein a data memory allocated to the programmable logic control device stores a control algorithm ready to be accessed which enables the control device, upon its activation, to control the method of the invention automatically.

The device may further comprise a pneumatic braking device controllable by the programmable logic control device and including a brake nozzle connectible to a compressed-air line for generating a brake air stream directed to the turbine wheel of the turbocharger rotor in opposition to the direction of rotation of the turbocharger rotor.

For fast run-up of the turbocharger rotor, a fast run-up valve controlled by the programmable logic control device in dependence upon time may be arranged upstream of the at least one drive nozzle, through which valve the at least one drive nozzle is connectible to the compressed-air line.

The present invention will be explained in more detail in the following with reference to embodiments illustrated in the accompanying drawing. In the drawing, FIG. 1 is a block diagram of a first pneumatic driving device for driving a turbocharger rotor in a balancing machine; and FIG. 2 is a block diagram of a second pneumatic driving device for driving a turbocharger rotor in a balancing machine.

Figure 2:
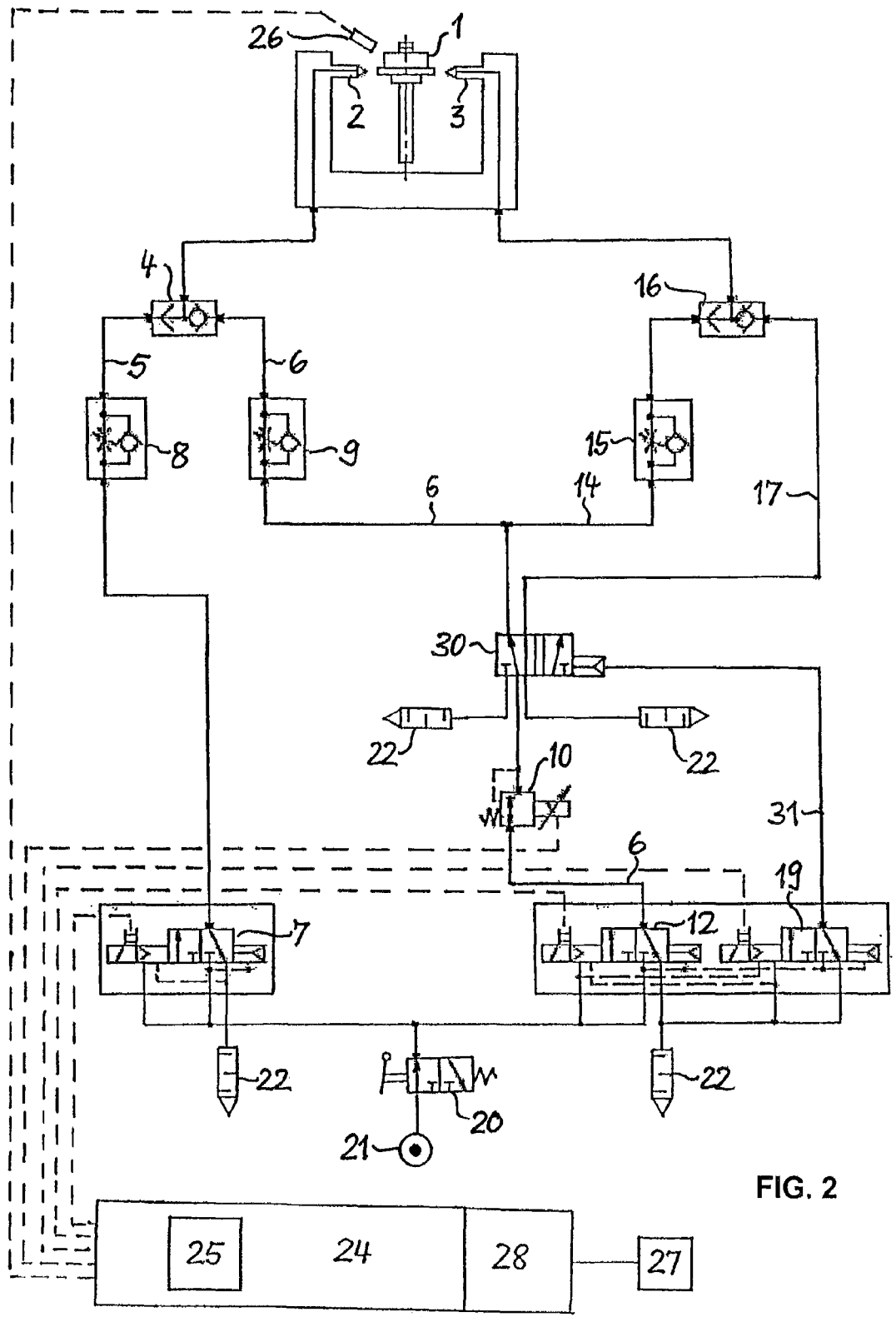

The block diagram shown in FIG. 1 illustrates schematically a turbocharger rotor 1 with vertical axis of rotation and devoid of the means for journaling it for rotary movement. The turbine wheel of the turbocharger rotor 1 is located between a drive nozzle 2 and an oppositely facing brake nozzle 3. The drive nozzle 2 is arranged in such fashion that an air jet it generates drives the turbocharger rotor 1 in its normal direction of rotation. By contrast, the brake nozzle 3 is arranged so that an air jet it generates impinges on the turbocharger rotor 1 in opposition to its normal direction of rotation, hence decelerating it.

The drive nozzle 2 is connected to two parallel branch lines 5, 6 via a shuttle valve 4 with OR function. Branch line 5 leads to a fast run-up valve 7 which is formed by an electromagnetically actuatable directional control valve with pilot control. Inserted in branch line 5 is an adjustable throttle check valve 8 which opens in the direction of the fast run-up valve 7. The throttle check valve 8 serves to adjust the flow rate for the fast run-up function.

Branch line 6 leads from the shuttle valve 4 via an adjustable throttle check valve 9 to an electromagnetically proportionally controllable pressure control valve 10 which serves to control the drive speed of the turbocharger rotor 1. The inlet of the pressure control valve 10 is connected, via a pressure limiting valve 11, to a normal running valve 12 formed by an electromagnetically actuatable directional control valve with pilot control. The pressure limiting valve 11 is adjustable, maintaining the pressure at the inlet of the proportional pressure control valve 10 at a set maximum value. The throttle check valve 9 throttles the fluid current in the direction of the drive nozzle 2, and its check valve opens in the opposite direction.

Branching off from the branch line 6 between the throttle check valve 9 and the pressure control valve 10 is a branch line 14 leading via an adjustable throttle check valve 15 to a shuttle valve 16 having its outlet connected to the brake nozzle 3. Via a branch line 17 containing an adjustable throttle check valve 18, the other inlet of the shuttle valve 16 is connected to a brake valve 19 formed by an electromagnetically actuatable directional control valve with pilot control. The throttle check valves 15, 18 throttle the fluid current in the direction of the shuttle valve 16 and open in the opposite direction without throttling effect.

The fast run-up valve 7, the normal running valve 12 and the brake valve 19 have their forward-flow sides connected to a source of compressed air 21 via an on/off valve 20 and their return flow sides connected to atmosphere via silencers 22. Control of the fast run-up valve 7, the normal running valve 12 and the brake valve 19 is via an electrical programmable logic control device 24 connected to the actuating magnets of said valves. The control device 24 comprises an internal controller 25 to which the electrical actuating drive of the pressure control valve 10 is connected. The control device 24 is also connected to a speed sensor 26 supplying a signal proportional to the speed of the turbocharger 1 to a fast counter input of the control device 24 where it enters the computation of an actual speed. The target speed may be entered on an input device 27. A data memory 28 connected to the control device may be used for entering and holding available entered and empirically determined parameters and programs.

For a normal run-up of the turbocharger 1, the normal running valve 12 is activated, causing the branch line 6 to be connected to the source of compressed air 21. Using prior determined and stored parameters for the turbocharger rotor 1 to be driven, the controller 25 of the control device 24 causes the pressure control valve 10 to occupy its optimum open position, compressed air at the pressure controlled by the pressure control valve 10 being directed via the throttle check valve 9 and the shuttle valve 4 to the drive nozzle 2 and also via the throttle check valve 15 and the shuttle valve 16 to the brake nozzle 3. In this arrangement, the throttle check valves 9, 15 are adjusted in such manner that the propulsive power of the drive nozzle 2 exceeds the braking power of the brake nozzle 3 a significant amount, causing the turbocharger rotor 1 to be accelerated continuously up to the predetermined target speed. When the target speed is reached, the pressure control valve 10 is controlled by the controller 25 such that the propulsive power of the drive nozzle 2 and the braking power of the brake nozzle 3 are maintained constant within narrow limits.

To bring the turbocharger rotor 1 to a standstill, the normal running valve 12 is switched back to the rest position in which the branch line 6 is connected to atmosphere. At the same time, the brake valve 19 is switched to the open position for a prior determined period of time in which the brake nozzle 3 is connected to the source of compressed air 21 via the shuttle valve 16 and the throttle check valve 18. The brake nozzle 3, which alone is then effective, decelerates the turbocharger rotor 1, with the on-period of the brake nozzle 3, which corresponds to the predetermined braking time, being computed on given adjustment of the throttle check valve 18 such that the turbocharger rotor 1 essentially comes to a standstill.

When it is desired to bring the turbocharger rotor 1 to the predetermined target speed faster than is possible by switching the normal running valve 12, the fast run-up valve 7 may be switched to an open position, initially for a predetermined period of time. As a result, solely the drive nozzle 2 is connected to the source of compressed air 21 via the shuttle valve 4 and the throttle check valve 8, enabling a very fast run-up to be achieved at an increased pressure and without any braking effect on the part of the brake nozzle 3. In this case, the on-period of the fast run-up valve 7 has to be adjusted in such manner that the speed of the turbocharger rotor 1 does not shoot beyond the predetermined target speed. Closing of the fast run-up valve 7 is immediately followed by opening of the normal running valve 12, causing the speed of the turbocharger rotor 1 to be brought to, and maintained at, target speed.

The various control parameters for the pneumatic drive described are dependent on configuration, size and axial moment of inertia of each turbocharger rotor to be balanced. Therefore, the necessary parameters have to be determined for each type of turbocharger rotor to enable a measuring run to be performed with controlled drive speed. According to the invention, the necessary parameters are determined by means of a tuning run which can be performed automatically under control of the suitably programmed control device of the pneumatic drive. Upon input of the target value for the balancing speed of the turbocharger rotor to be driven, an operator starts the tuning run which then proceeds automatically as follows:

- The control device 24 initially sets its internal controller 25 to a pure proportional control action (P action) and selects first a very high gain (proportional coefficient) Kp.
- With this setting and applying the balancing speed to the controller 25 as target value, the control device 24 starts a first trial run by driving the normal running valve 12.
- If the trial run determines that the measured actual speed of the turbocharger rotor 1 exceeds by far the target value during the acceleration phase, the drive is stopped by the normal running valve 12 being switched back and the brake valve 19 being driven by means of the brake nozzle 3 at the braking power fixedly set by the throttle check valve 18. Then the gain Kp is halved, and the drive restarted. This cycle is repeated until the speed actual value measured no longer exceeds the target value. The drive continues to be on, and the actual speed of the driven turbocharger rotor as controlled by the controller 25 will as a rule then be below the target speed.
- The suitably programmed control device then generates an additional target value and applies it additively to the entered target value. Starting from zero, this additional target value continues to be incremented or decremented until the speed actual value reaches the target value entered.
- The prior determined controller gain Kp and the final additional target value are stored in the data memory 28 in combination with the type of turbocharger rotor driven and is held available for all future measuring runs of the control device 24.
- Subsequently, the drive is decelerated by means of the brake nozzle 3, with the optimum braking time being computed, also stored by type and held available for future measuring runs of the control device 24. If the braking time computed proves to be too long or too short, the throttle check valve 18 can be adjusted and the process repeated for determining the optimum braking time.
- Then, by solely driving the fast run-up valve 7, the fast run-up mode is activated briefly, including computing the optimum fast run-up time, storing it by type, and holding it available to the control device 24 for all future measuring runs. The computed fast run-up time may also be equal to 0.0 s if the program of the control device 24 determines that the fast run-up function is not able to produce an increase in the run-up dynamics, as, for example, on turbocharger rotors having a low moment of inertia.

In measuring runs for determining the unbalance of a turbocharger rotor, the program of the control device temporarily applies a type-independent I component to the controller upon attainment of a narrow speed tolerance band. The I component is used for loop tuning only briefly, being then immediately frozen until the beginning of the next measuring run. In this way, steady-state errors can be avoided, which may occur on turbocharger rotors of like type from one batch to the next due to manufacturing tolerances.

The method described for determining and optimizing open- and closed-loop control parameters for a pneumatic drive of a turbocharger rotor can be implemented largely automatically and places no high demands on the machine operator. The method is fast and produces reliable measuring runs. Optimization and tuning methods known for standard control loops have proven to be unsuccessful because the drive is designed to cause the controller to act in one quadrant only. The method is straightforward because, apart from the input of the target speed, no further parameters need to be specified, these being automatically determined empirically. The method supplies meaningful control parameters leading quickly to the desired reference action with minimum speed error.

FIG. 2 shows a second embodiment of the pneumatic driving device modified with regard to the control of the braking process. In this embodiment, the pressure of the compressed air supplied to the brake nozzle 3 and hence the braking power is controllable by means of the proportional pressure control valve 10 which serves to control the drive air. To this effect, the branch line 6 leading to the drive nozzle 2 includes between the pressure control valve 10 and the branch point of the branch line 14 a pneumatically actuatable multiway valve 30 which is connected to, and controllable by, the brake valve 19 via a control line 31. Alternatively, it would be possible for the multiway valve 30 to be provided with an electromechanical actuating device and controllable directly by the control device 24. The multiway valve 30 has three inlets and two outlets. The center inlet is connected to the pressure control valve 10 and the two outer inlets to atmosphere each via a silencer 22. Connected to the one outlet of the multiway valve 30 is the branch line 6 and to the other outlet a branch line 17 leading to the shuttle valve 16 arranged upstream of the brake nozzle 3. Being no longer necessary, the adjustable throttle check valve 18 arranged in the branch line 17 in the embodiment of FIG. 1 is omitted.

In the one position intended for driving the turbocharger rotor 1, the multi-way valve 30 closes the branch line 6, connecting the branch line 17 to atmosphere. In the other position intended for braking the turbocharger rotor 1 and in which the multiway valve 30 is switched by the brake valve 19 being activated, the multiway valve 30 connects the branch line 17 to the pressure control valve 10, and the outlet connected to the branch line 6 to atmosphere. In this manner, it is possible during braking to control the pressure on the brake nozzle 3 by means of the control device 24 through the pressure control valve 10. To accomplish this, the control device 24 requires a brake manipulated variable retrievable from the data memory and allocated to the pressure control valve 10 for control of the braking pressure.

In the absence of a stored brake manipulated variable assigned to a particular type of turbocharger rotor, the programmable logic control device uses a programmed internal brake manipulated variable of, for example 50%, as in a tuning run for empirically determining control parameters, which 50% corresponds, for example, to a compressed air pressure at the brake nozzle of 3 bar. A type-specific brake manipulated variable then has to be determined empirically in a tuning run, as described in the following.

For a tuning run to determine the control parameters for the pneumatic drive of the turbocharger rotor to be balanced, the programmable logic control device uses, if available, a stored type-specific brake manipulated variable, otherwise the internal brake manipulated variable. If it is necessary to brake the turbocharger rotor 1 during the tuning run, the control device switches the multiway valve 30 to the braking position, allocating the brake manipulated variable to the pressure control valve 10. The normal running valve 12 remains set to the drive mode. As soon as the speed sensor 26 detects that the turbocharger rotor is at standstill, the multiway valve 30 is switched back, for example, upon alteration of the gain Kp of the controller 25, and the manipulated variable generated by the controller is allocated to the pressure control valve 10, causing the turbocharger rotor to be driven again. As described with reference to FIG. 1, this process may be repeated until the control parameters sought, as the gain Kp of the controller 25 and the target value additional to the set target value, are determined and stored as type-specific data.

Once a tuning run has determined and stored the parameters sought, the optimum brake manipulated variable for braking the turbocharger rotor 1 can be determined in the following advantageous manner. The turbocharger rotor 1 is driven at controlled target speed and braked by driving the brake valve 19 and switching the multiway valve 30 into the braking position, with the pressure control valve 10 being assigned the internal brake manipulated variable of 50%. As soon as the drive is stopped, the brake valve 19 and the multiway valve 30 are switched back to the drive position, and the pressure control valve 10 is closed, being assigned the manipulated variable 0%. At the same time, the braking time resulting at 50% braking pressure and indicative of the duration of the braking process until standstill of the turbocharger rotor is measured and placed in relation to a nominal braking time of, for example, 1.5 s. The internal brake manipulated variable is multiplied by the computed factor. If the result is a brake manipulated variable greater than 100%, a brake manipulated variable 100% or its corresponding pressure of, for example, 6 bar is stored in the data memory 28 where the data of the turbocharger rotor type is already held. In all other cases, the computed percentage value of the brake manipulated variable is stored as a type-specific value. An example: If the measured braking time is 2 s and the nominal braking time is 1.5 s, the ratio 2 s to 1.5 s yields a factor of 1.33. The computed brake manipulated variable is then 1.33×50%=66.66%.

For verification and more precise adjustment of the brake manipulated variable, a further run includes accelerating the turbocharger rotor 1 again to balance speed, decelerating it using the computed brake manipulated variable assigned to the pressure control valve 10, and measuring the braking time. The braking time measured is used for recalculating the brake manipulated variable in the same manner, and the result of the recalculation is stored as type-specific data and held available to the control device 24 for all subsequent measuring runs of the same type.

The arrangement shown in FIG. 2 for controlling the braking process and the method described afford the advantage of dispensing with the need for manual adjustment of an adjustable throttle for controlling the air supply to the brake nozzle. In view of the comparatively large spectrum of different types of rotor measured and balanced in the same balancing machine, not all types of rotor covered by it can be braked to satisfaction with a mean adjustment of a throttling device for the brake air. Where large moments of inertia are involved, the braking times are long and prolong the cycle time. Where small moments of inertia are involved, the resulting braking times may be too short, which may cause the braking pressure to be turned off incorrectly. By controlling the braking pressure by means of the proportional pressure control valve, it is possible to adjust the braking pressure to the different types of turbocharger rotor and achieve a substantially uniform short braking time for the different types.

The invention claimed is:

1. A method for pneumatically driving a turbocharger rotor in a balancing machine, in which the propulsive power of a pneumatic drive is controlled in dependence upon the rotational frequency of the turbocharger rotor via a programmable logic control device having an adjustable internal controller, where the rotational frequency of the turbocharger rotor is detected by a speed sensor and the speed signal is transmitted to the controller as actual value, and wherein parameters necessary for the control are determined empirically by a tuning run comprising the following steps:
  (a) tuning the controller to an exclusively proportional control action with high gain and input of the nominal balancing speed as target value for the controller;
  (b) starting the pneumatic drive and accelerating the turbocharger rotor, monitoring the actual speed of the turbocharger rotor and comparing the actual speed with the target value, continuing with step (c) if the actual speed exceeds the set target value, or continuing with step if (d) if the actual speed below the set target value;
  (c) terminating the and decelerating the turbocharger rotor, halving the high gain of the controller and repeating step (b);
  (d) approximating the actual speed to the target speed by generating an additional target value and additively applying the additional target value to the set target value and incrementing or decrementing the additional target value until the target speed of the turbocharger rotor is reached; and
  (e) storing the determined high gain of the controller, the set target value and the determined additional target value as parameters ready to be the accessed for controlling future measuring runs of the turbocharger rotor subjected to the tuning run and further turbocharger rotors corresponding type.

2. The method according to claim 1, wherein in an unbalance measuring run succeeding the tuning run and upon attainment of a narrow speed tolerance band, an I component is temporarily applied to the controller to be used for loop tuning briefly and then frozen until the beginning of the next unbalance measuring run.

3. The method according to claim 1, wherein the turbocharger rotor is decelerated via a pneumatic braking device under control of the programmable logic control device, with the braking and/or the braking power of the braking device being adjusted to a value dependent on the type of turbocharger rotor.

4. The method according to claim 3, wherein the tuning run comprises a step (f) in which the turbocharger rotor driven at target speed is decelerated, the optimum braking time for deceleration until standstill is computed and stored as readily accessible parameter for the control of future measuring runs of the turbocharger rotor and turbocharger rotors of corresponding type.

5. The method according to claim 3, wherein step (f) succeeds immediately upon step (e).

6. The method according to claim 1, wherein the turbocharger rotor is decelerated under control of the programmable logic, control device via a pneumatic braking device whose braking power is controlled by the control device via a proportional pressure control valve according to a brake manipulated variable predetermined or determined empirically for particular type of turbocharger rotor.

7. The method according to claim 6, wherein the tuning run comprises a step (f) in which the turbocharger rotor driven at target speed is decelerated until standstill usine a braking power predetermined by a programmed internal brake manipulated variable, the required braking time is measured, compared with a nominal braking time, and a type-specific brake manipulated variable is calculated.

8. The method according to claim 7, wherein step (f) is succeeded by a step (g) in which the turbocharger rotor driven at target speed is decelerated until standstill using a braking power predetermined by the type-specific brake manipulated variable, the required braking time is measured, compared with the nominal braking time, in the event of a deviation, the type-specific brake manipulated variable is corrected by recalculation and stored as a readily accessible parameter for the control of future measuring runs of the turbocharger rotor subjected to the tuning run and further turbocharger rotors of corresponding type.

9. The method according to claim 1, wherein the pneumatic drive is equipped with a time-controlled fast run-up function, wherein in the tuning run the turbocharger rotor is accelerated from standstill by activating the fast run-up function during a brief time span with the controller deactivated, with the optimum fast run-up time being calculated and stored as a readily accessible Parameter for the control of future measuring runs of the turbocharger rotor and of turbocharger of corresponding type.

10. The method according to claim 1, wherein it is programmed as a control algorithm and said control algorithm is held ready for access in a data memory allocated to the programmable logic control device, so that the method can be implemented automatically by said programmable logic control device upon its activation.

11. A device for pneumatically driving a turbocharger rotor in a balancing machine, wherein the pneumatic drive of the turbocharger rotor includes at least one drive nozzle connectible to a compressed-air line for generating a drive air stream directed to a turbine wheel of the turbocharger rotor, wherein the flow rate of the drive air stream is controllable in dependence upon the speed of the turbocharger rotor via a proportional pressure control valve arranged upstream of the at least one drive nozzle and controlled by a programmable logic control device, wherein a data memory allocated to the programmable logic control device stores a control algorithm ready to be accessed which enables the control device, upon its activation, to control the method according to claim 1 automatically, and wherein the device further comprises a pneumatic breaking device controllable by the programmable logic control device and including a brake nozzle connectible to a compressed-air line for generating a brake air stream directed to the turbine wheel of the turbocharger rotor in opposition to the direction of rotation of the turbocharger rotor.

12. The device according to claim 11, wherein the brake nozzle is connected by a shuttle valve either through a first adjustable throttle check valve to the line for the supply of drive air to the drive nozzle, or via a line to a valve for the supply of brake air.

13. The device according to claim 12, wherein the valve for the supply of brake air is a multiway valve which is connected to the outlet of the proportional pressure control valve and enables the pressure control valve to be connected to the drive nozzle or to the brake nozzle.

14. The device according to claim 11, wherein for fast run-up of the turbocharger rotor the at least one drive nozzle is connected parellel to the proportional pressure control valve to a fast run-up valve controlled by the programmable logic control device in dependence upon time, through which valve the at least one drive nozzle is connectible to the compessed-air line.

15. A device pneumatically driving a turbocharger rotor in a balancing machine, wherein the pneumatic drive of the turbocharger rotor includes at least one drive nozzle connectible to a compressed-air line generating a drive air stream directed to a turbine wheel of the turbocharger rotor, wherein the flow rate of the drive air stream is controllable in dependence upon the speed of the turbocharger rotor via a proportional pressure control upstream of the at least one drive nozzle and controlled by a programmable logic control device, wherein a data memory allocated to the programmable logic control device stores a control algorithm ready to be accessed which enables the control device, upon its activation, to control the method according to claim 1 automatically, and wherein for fast run-up of the turbocharger rotor the at least one drive nozzle is connected parallel to the proportional pressure control valve to a fast run-up valve controlled by the programmable logic control device in dependence upon time, through which valve the at least one drive nozzle is connectible to the compressed-air line.

* * * * *

UNITED STATES PATENT AND TRADEMARK OFFICE
CERTIFICATE OF CORRECTION

PATENT NO. : 9,581,166 B2  
APPLICATION NO. : 14/380227  
DATED : February 28, 2017  
INVENTOR(S) : Hoerr Page 1 of 1

It is certified that error appears in the above-identified patent and that said Letters Patent is hereby corrected as shown below:

In the Claims

In Column 9, Line 25 (Line 6 of Claim 1) please change "where" to correctly read: --wherein--.

In Column 9, Line 38 (Line 19 of Claim 1) please change "step if (d)" to correctly read: --step (d)--.

In Column 9, Line 39 (Line 20 of Claim 1) before "and" please insert: --drive--.

In Column 9, Line 56 (Line 3 of Claim 2) after "narrow" please insert: --actual--.

In Column 9, Line 63 (Line 4 of Claim 3) before "and/or" please insert: --time--.

In Column 10, Line 10 (Line 3 of Claim 6) after "logic" please delete: ",".

In Column 10, Line 14 (Line 7 of Claim 6) after "for" please insert: --a--.

In Column 10, Line 39 (Line 7 of Claim 9) please change "Parameter" to correctly read: --parameter--.

In Column 10, Line 41 (Line 9 of Claim 9) after "turbocharger" please insert: --rotors--.

In Column 10, Line 62 (Line 15 of Claim 11) please change "breaking" to correctly read: --braking--.

In Column 11, Line 13 (Line 3 of Claim 14) please change "parellel" to correctly read: --parallel--.

In Column 12, Line 2 (Line 4 of Claim 15) after "line" please insert: --for--.

In Column 12, Line 6 (Line 8 of Claim 15) after "control" please insert: --valve arranged--.

Signed and Sealed this  
Sixth Day of June, 2017

Michelle K. Lee  
*Director of the United States Patent and Trademark Office*